Sept. 18, 1923.  H. H. HILL  1,468,294
DUMP BODY
Filed June 29, 1921   4 Sheets-Sheet 1
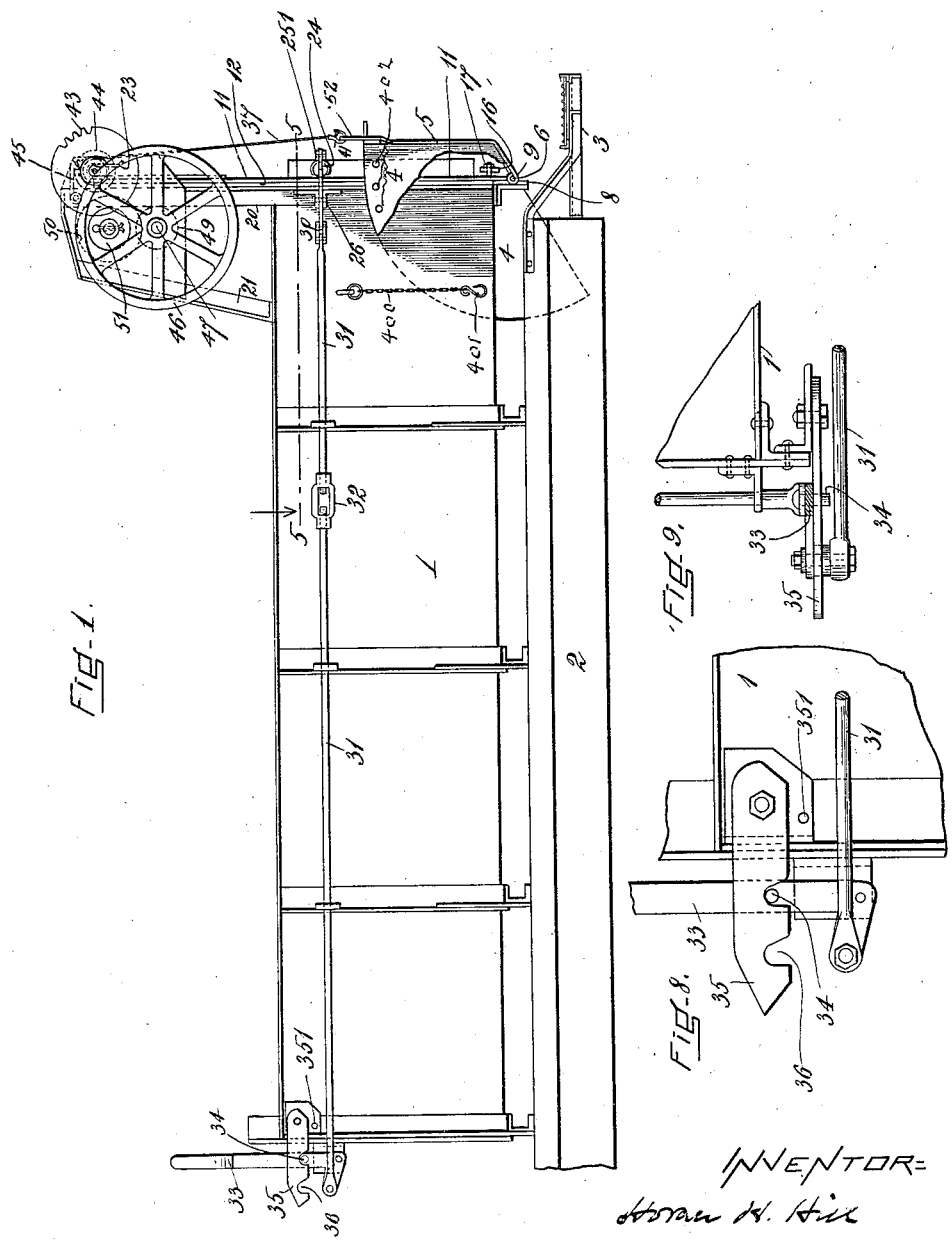

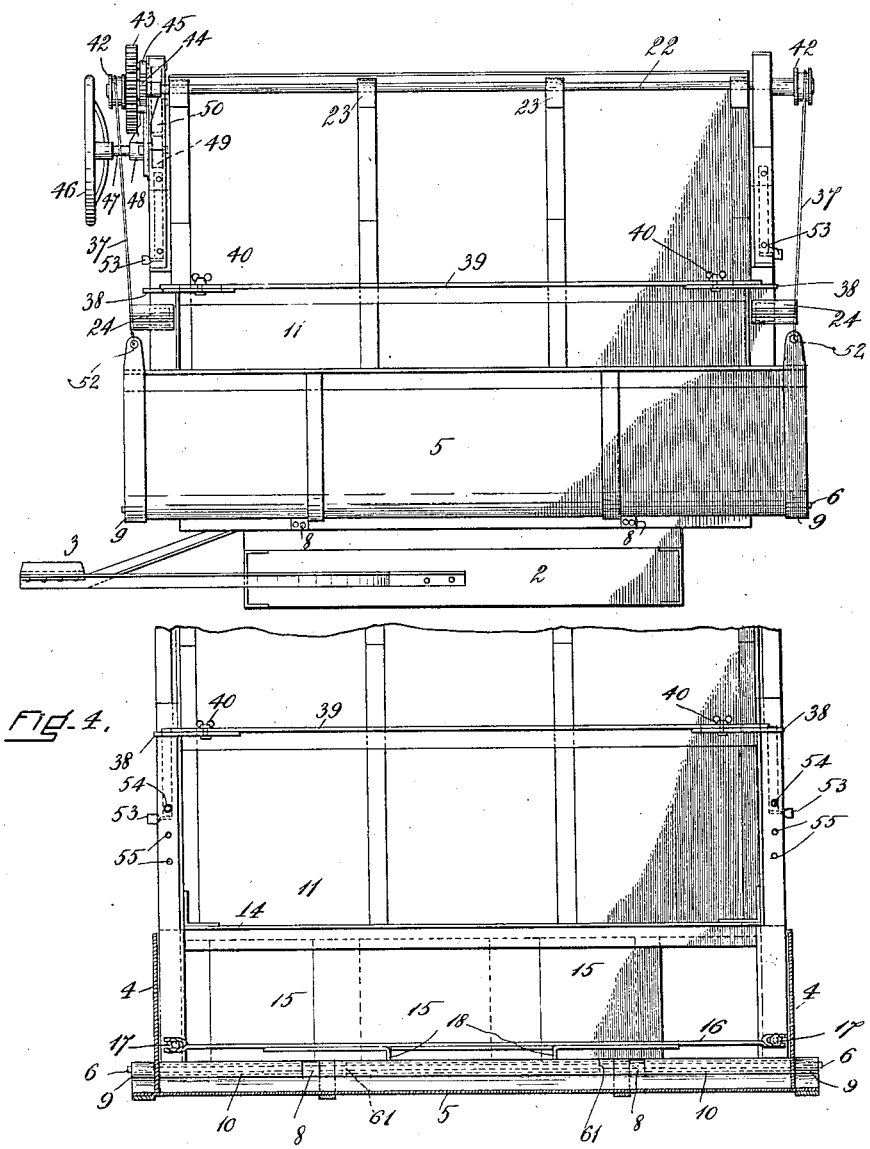

Sept. 18, 1923.
H. H. HILL
1,468,294
DUMP BODY
Filed June 29, 1921
4 Sheets-Sheet 3
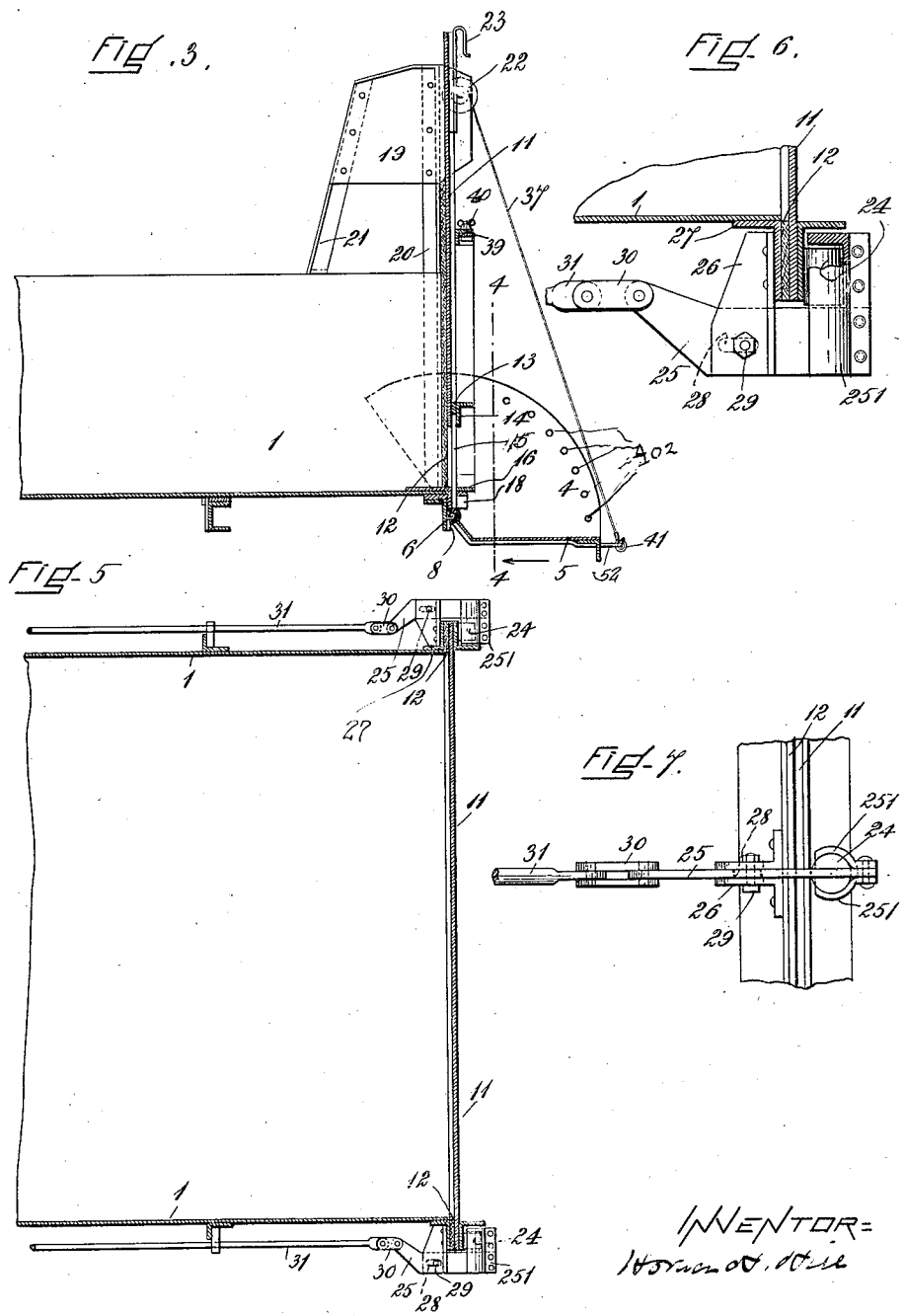

Sept. 18, 1923.  1,468,294
H. H. HILL
DUMP BODY
Filed June 29, 1921  4 Sheets-Sheet 4

INVENTOR:
Howard H. Hill
By their attorneys
ATTORNEYS

Patented Sept. 18, 1923.

1,468,294

UNITED STATES PATENT OFFICE.

HORACE H. HILL, OF ARLINGTON, MASSACHUSETTS.

DUMP BODY.

Application filed June 29, 1921. Serial No. 481,248.

*To all whom it may concern:*

Be it known that I, HORACE H. HILL, of Arlington, in the county of Middlesex and State of Massachusetts, a citizen of the United States, have invented a new and useful Improvement in Dump Bodies, of which the following is a specification.

My invention relates to dump bodies, more particularly to bodies for carts used in road-making where it is desired to transfer from a mixer or other source of supply a quantity of material which is to be dumped upon the road. It is usual in such cases to take a load to a convenient spot on the roadbed and there dump it and afterward spread it by shovels, etc.

The main purpose of my dump body is to arrange the tail of the body in such a manner that it will dump the load in the usual way, or may dump it gradually while the cart is in motion so that the thickness of the layer may be controlled and there will be left on the roadbed a layer of the desired thickness only, this layer extending for some distance along the roadbed according to the rate of travel of the cart. Moreover, my invention provides means whereby the width of the layer may be controlled.

In the drawings I have shown only the dump body, not the wheels by which it is supported, nor the driver's seat or means whereby one end of the body may be lifted so as to give the body the necessary inclination to cause the material to slide from it.

My invention will be understood by reference to the drawings in which it is shown in its preferred form.

Figure 1 is a dump body embodying my invention.

Fig. 2 is a rear elevation thereof.

Fig. 3 is a longitudinal vertical section of the rear end of the body.

Fig. 4 is a section on line 4—4 of Fig. 3 to show the way of mounting the spreader.

Fig. 5 is a section on line 5—5 of Fig. 1 showing the means for controlling the tail gate.

Fig. 6 is an enlarged detail of a portion of the tail gate controlling mechanism in plan, partly in section;

Fig. 7 being a side view thereof.

Fig. 8 is a side elevation of the means for operating said controlling mechanism.

Fig. 9 is a plan thereof.

Figure 10:
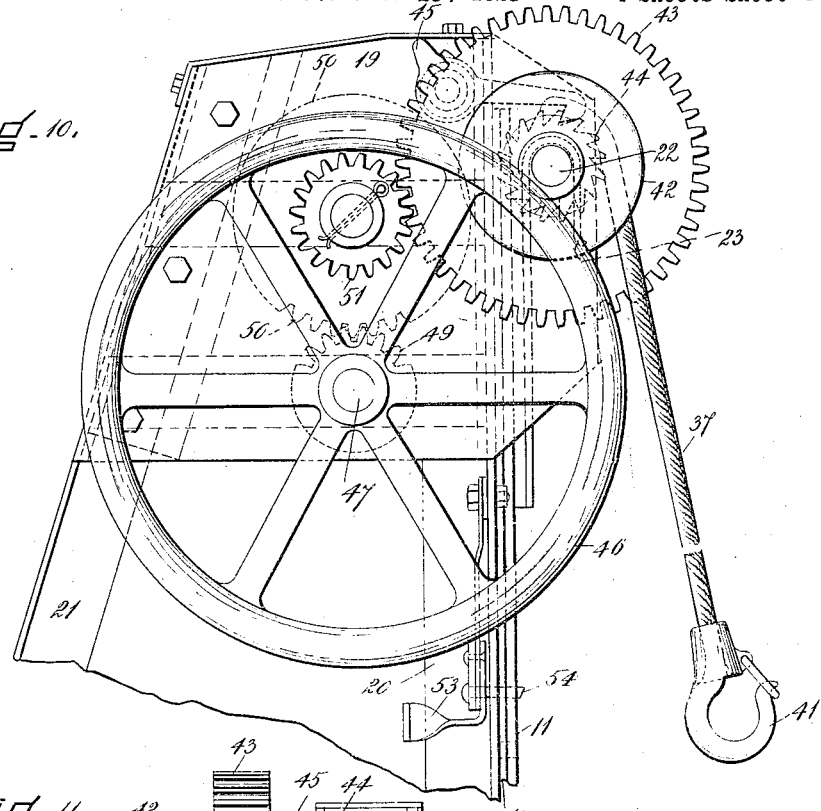
Figure 11:
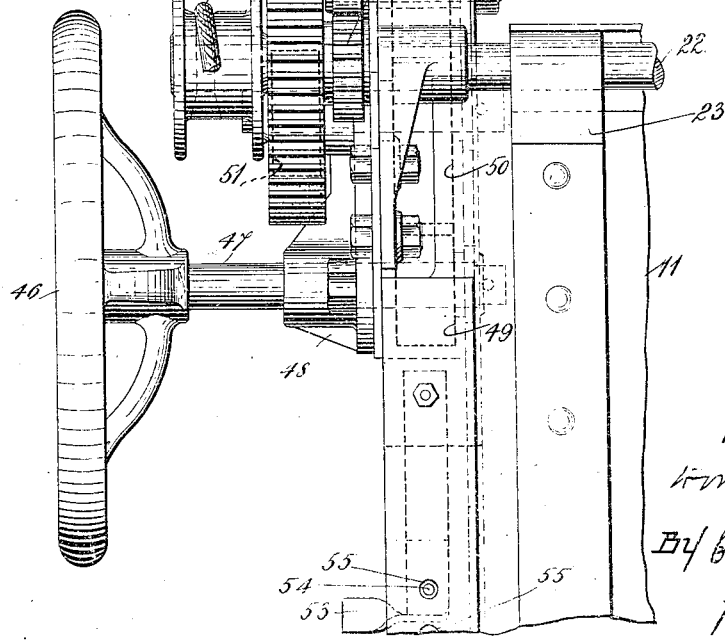

Fig. 10 is an enlarged elevation of the mechanism for controlling the spreader and tail gate, and Fig. 11 is a front elevation thereof.

1, 1 are the sides of the dump body which are mounted on rails 2 in the usual way, 3 being a step attached to one of the side rails to enable the operator to reach the mechanism for controlling the spreader and tail gate. The body is strengthened by angle or other irons as may be necessary. To the rear end of the flooring of the body is hinged a spreader which as shown comprises two segmental side pieces 4, one on each side of the body, connected by a partial flooring 5 which is angular in cross section (see Figs. 1 and 3) so as to form a troughlike structure. Straps 8 attached to the under side of the body have eyes forming one member of the hinge and eyes 9 attached by straps to the spreader form the other member of the hinge. A rod 6 passing through these hinge members forms the hinge pin. Sections of tubing 10 within which are preferably wooden bushings 61 lie between these various eyes. 11 is the tail gate which as shown lies against packing strips 12 which face the rear edge of the body and are preferably of wood or some other material such that the tail gate may form with them a liquidtight closure, for such carts are sometimes used to carry a more or less liquid material and such packing is usually necessary to prevent leakage.

The tail gate carries near its bottom a strip of metal 13 against which is attached an angular shaped bar 14 so that there is formed between the lower end of this bar 14 and the tail gate a groove in which are mounted a plurality of slides 15. When the tail gate is partially raised this construction is such that these slides may either close entirely the opening so formed between the bottom of the tail gate and the flooring of the body or may be moved past each other as indicated in Fig. 4, thus opening a portion of the lower end of the tail gate. When the material is to be spread over an area extending the width of the cart body these slides will be removed and the tail gate will rest on the flooring of the cart until released as above described. When, however, the slides are used the tail gate is raised the desired amount before loading and the slides are put in place, their bottoms being restrained against the weight of the load by the bar 16 the ends of which are held in place by the bolts 17 attached to the lower ends of the sides of the cart. Lugs 18 attached to the inner side of the bar support it between its ends on the tube sections 10.

On each side of the rear end of the body there is a plate 19 supported on uprights 20, 21, to one end of which is attached the wooden packing strip 12. Across from one of these plates 19 to the other is a shaft 22 to which is attached the mechanism for turning it and adjusting the positions of the spreader and also of the tail gate as below described. The tail gate 11 has at its upper end hooks 23 which when the tail gate is in its lowest position hang on the rod or shaft 22 so that the tail gate may be swung outward when it is desired to dump the load. To hold the tail gate normally in vertical position against the rear end of the cart I provide at either side of the body a roll 24 which is mounted on the end of a lever 25 pinned to a bracket 26 attached to an angle iron 27 which is fastened to the outside of the rear end of the body so that the roll may be moved into and out of clamping or holding position. As shown this roll is held in fixed jaws 251 bolted one on each side of the end of the lever (see Figs. 1, 6 and 7) said jaws forming a cage in which the roll is free to turn. The lever 25 has a slot 28 through which passes a bolt 29 which serves as a fulcrum for the lever 25, this construction allowing a slight adjustment of the location of the fulcrum as well as the position of the roll as a lock.

Each lever 25 is connected by a link 30 with a rod 31 preferably made in two parts connected by a turnbuckle 32, the further end of the rod being attached to a handle lever 33 carrying a pin 34. 35 is a latch pivoted to the front end of the body and having two or more notches 36 adapted to engage the pin 34 on the handle lever 33. 351 is a stop pin to limit the movement of the latch 35. It will be seen that by throwing up or disengaging the latch 35 the handle lever 33 may be moved outwardly, thus moving the rod 31 to the right in Figs. 1 and 6 and forcing the lever 25 around its pivot 29 in such a way as to withdraw the roll 24 from its position against the tail gate, thus releasing the tail gate. The tail gate may then be swung outwardly as above suggested about the shaft 22 as an axis.

The tail gate is lifted by means of the ropes 37 which may be attached to extensions 38 of a crosspiece or angle iron 39 attached to the rear side of the tail gate, the roll at this time serving to reduce friction. These extensions are normally as shown in Fig. 2 drawn inwardly and held in place by thumb nuts 40. If it is desired to lift the tail gate these extensions are pushed outwardly more nearly into line with the ropes 37 and hooks 41 at the ends of the ropes 37 are then hooked into holes or openings in the extensions 38, and the mechanism to be described for winding up the ropes is actuated.

The shaft 22 carries thereon a pulley 42. This shaft runs across the body of the cart at its rear end, being mounted in the plate 19 and at one end, say the left end (see Fig. 2), it extends beyond the side wall of the cart sufficiently far to carry also a gear 43 and a ratchet wheel 44 controlled by a pawl 45, the pawl being also mounted on the plate 19.

46 is a hand wheel on the end of a shaft 47 mounted in a bearing or hub 48 attached to the plate 19 and carrying a pinion 49 which meshes with a gear 50 on a shaft also carrying a pinion 51 which is in mesh with a gear 43. By turning the hand wheel it will be seen that the pulley 42 will be turned and the hooks 41 will be raised or lowered as the case may be. In order to operate the spreader it is provided with eyes 52 with which the hook 41 may engage.

In order to hold up the tail gate after it has been lifted and thus allow the ropes 37 to be released from the tail gate for other duty, I provide a spring catch 53 carrying a pin 54 which engages any one of a number of openings 55 in the side edges of the tail gate.

As stated above, the purpose of this invention is to provide means for distributing material, more particularly in the making of roadbeds. For this purpose it may be desired to dump a load as a whole at a particular spot on the roadbed and spread it by shovel. In this case all that is necessary is to release the tail gate by unlatching and moving the handle 33 so that the rolls 24 are moved out of engagement with the tail gate to allow the tail gate to swing about the rod or shaft 22 on which the hooks 23 hang. The front end of the body may then be raised so that the material will shoot out from it in a well known manner. In this case the spreader is first released so that the tail gate will swing by gravity into such position as not to interfere with the dumping of the load.

If the material is to be spread at a given thickness on the roadbed, the spreader is pulled upwardly so that its flooring lies at an angle, say of 45 degrees, to the horizontal, and is there held in place by means of chains 400 attached to the sides of the body and having hooks 401 adapted to engage suitable holes 402 in the sides of the spreader. The hooks 41 are released from the spreader and caused to engage the extensions 38 of the rod 39 which have been first properly adjusted. Thereupon the hand wheel 46 is turned to wind up the rope and raise the tail gate a short distance, sufficiently, however, to allow the material to flow out under it. The hooks 41 are then released from the tail gate and attached to the spreader which is adjusted in proper position and held in place by the pawl 45 and ratchet 44. The material in flowing out fills up the trough made by the flooring and side walls of the spreader and overflows the outer edge of the spreader so that as the cart moves along it leaves a sheet of material behind it the thickness of which sheet will depend upon the rapidity with which the cart is moved, the amount of material which is fed into the spreader and the angle the spreader floor 5 makes with the floor of the body.

If it is desired to cover only a narrow strip of roadway,—a strip that is narrower that the cart itself—the tail gate is first lifted into the position shown in Fig. 3 and the slide boards are put into their place below, the cart being then filled and taken to the place where the material is to be used. The appropriate slide board is moved so as to make an opening registering with the line of roadbed which is to be covered.

This body therefore is capable of three uses. It is easily managed, its use reducing considerably both in time and in amount the labor of road building or mending. It will of course be understood that many of the parts are duplicated on the two sides of the cart body, the operating mechanism, however, being on one side only, its movement being carried by the shaft 22 from one side to the other.

It is obvious to those skilled in the art that the various details above described may be changed without departing from the spirit of my invention.

What I claim as my invention is:—

1. In a dump body, a tail gate and means for supporting it at its top so that its bottom may be swung outwardly to dump a load, and means whereby said tail gate may be raised bodily, said supporting means comprising a fixed cross rod sustained by said body, and hooks attached to said tail gate adapted to hook over said rod and serve as a hinge for said tail gate and which hooks also permit said tail gate to be lifted off said rod when said tail gate is raised bodily, and a spreader with which said tail gate co-operates when so lifted.

2. In a dump body, a tail gate and means for pivotally supporting it at its top so that its bottom may be swung outwardly to dump a load, and means whereby it may also be raised vertically, in combination with means adapted to engage said tail gate between its top and bottom and by which means said tail gate will be normally held against the rear edges of the dump body, and a spreader with which said tail gate co-operates when so lifted.

3. In a dump body, a tail gate and means for supporting it whereby it may be swung outwardly to dump a load, and means whereby it may also be raised vertically, in combination with means adapted to engage said tail gate between its top and bottom edges whereby it will be normally held against the rear edges of the dump body, said engaging means comprising levers located one on each side of the dump body and rolls mounted to engage said tail gate and act as friction rolls as the gate is moved vertically and means controllable from the front end of the dump body whereby said levers may be moved to withdraw said rolls from contact with said tail gate.

4. In a dump body, a tail gate and means for supporting it whereby it may be swung outwardly to dump a load, and means whereby it may also be raised vertically, in combination with means adapted to engage said tail gate between its top and bottom edges whereby it will be normally held against the rear edges of the dump body, said engaging means comprising levers located one on each side of the dump body and rolls mounted to engage said tail gate and act as friction rolls as the gate is moved vertically and means controllable from the front end of the dump body whereby said levers may be moved to withdraw said rolls from contact with said tail gate, said means comprising a latch whereby the position of the rolls may be locked.

5. In a dump body, a vertically movable tail gate and slides located between the lower edge of the tail gate and the flooring of the body, and means adapted to hold them in vertical position and allow them to be moved past each other whereby openings of different widths may be made to allow a predetermined width of material to be dumped from said body.

6. In a dump body, a vertically movable tail gate and slides located between the lower edge of the tail gate and the flooring of the body, and means adapted to hold them in vertical position and allow them to be moved past each other whereby openings of different widths may be made to allow a predetermined width of material to be dumped from said body, said holding means comprising a removable bar.

7. A dump body having a tail gate and means, comprising a rotatable shaft and flexible connections, whereby said tail gate may be adjusted vertically when desired, in combination with a spreader pivotally attached to the rear end of said body, and adapted to be engaged by said flexible connections when the position of said spreader is to be adjusted.

HORACE H. HILL.